United States Patent [19]

Baladjanian et al.

[11] 4,285,459
[45] Aug. 25, 1981

[54] HIGH TEMPERATURE BRAZE REPAIR OF SUPERALLOYS

[75] Inventors: Gregor Baladjanian, Malibu; Robert L. Rothman, San Pedro, both of Calif.

[73] Assignee: Chromalloy American Corporation, St. Louis, Mo.

[21] Appl. No.: 62,410

[22] Filed: Jul. 31, 1979

[51] Int. Cl.³ ............................ B23P 6/04; B23K 1/04
[52] U.S. Cl. ................................ 228/119; 29/402.07; 29/402.18; 228/194; 228/238
[58] Field of Search ............... 228/119, 194, 239, 238; 29/402.07, 402.18

[56] References Cited

U.S. PATENT DOCUMENTS

| | | | |
|---|---|---|---|
| 3,632,319 | 1/1972 | Hoppin et al. | 228/194 |
| 3,759,692 | 9/1973 | Zelahy | 75/171 X |
| 4,004,047 | 1/1977 | Grisik | 29/402.18 |
| 4,008,844 | 2/1977 | Duvall et al. | 228/119 |
| 4,028,787 | 6/1977 | Cretella et al. | 228/119 X |
| 4,098,450 | 7/1978 | Keller et al. | 228/119 |

Primary Examiner—Joseph H. McGlynn
Assistant Examiner—K. J. Ramsey
Attorney, Agent, or Firm—William W. Haefliger

[57] ABSTRACT

Cracks in superalloys are braze repaired after notching or cutting away material adjacent the cracks, filling the recess with a braze component containing a melting point depressant and subjecting the repair area to a first elevated temperature to form a melt. The melting point of the repair region is raised by diffusing the depressant into the braze material and repair region at second and third elevated temperatures lower than the first elevated temperature to form a repaired superalloy exhibiting highly desirable properties.

20 Claims, 14 Drawing Figures

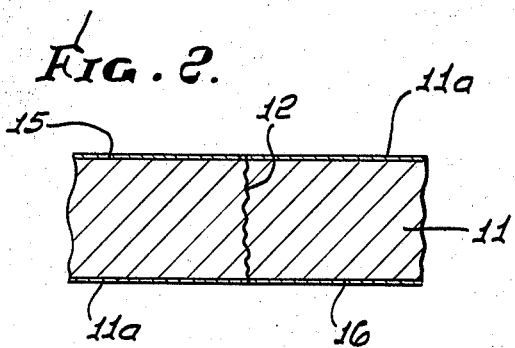
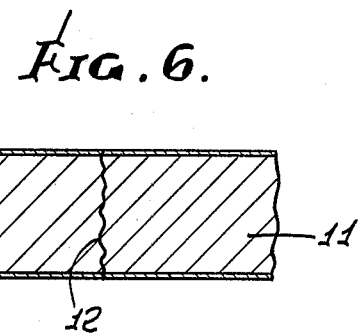
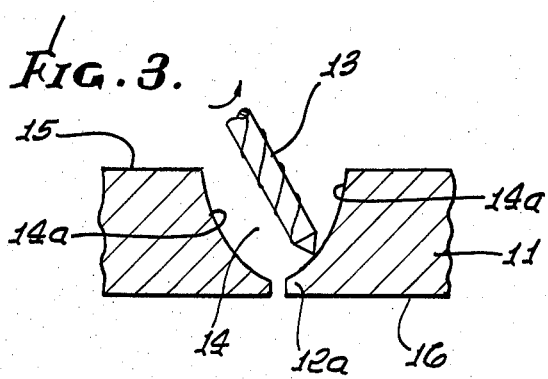
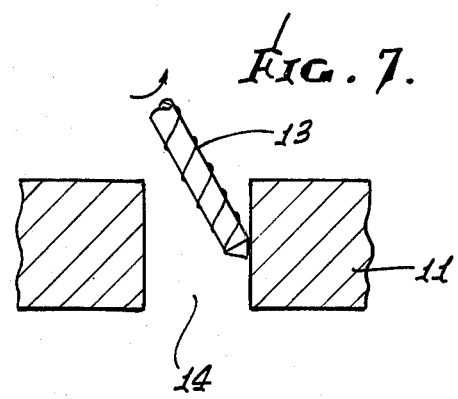
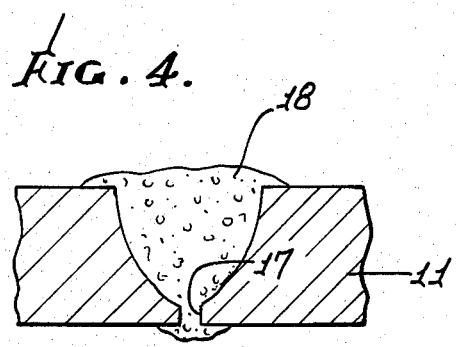
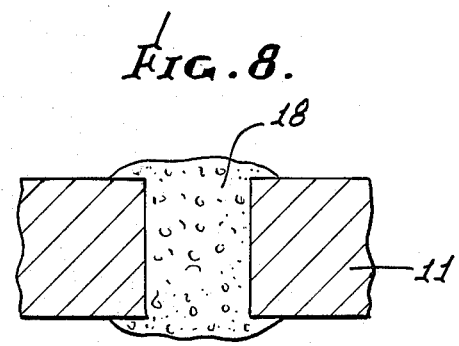
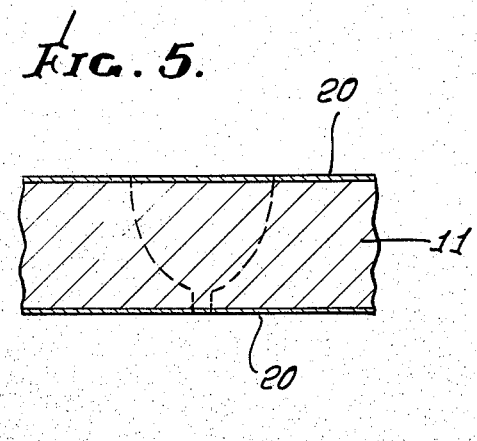
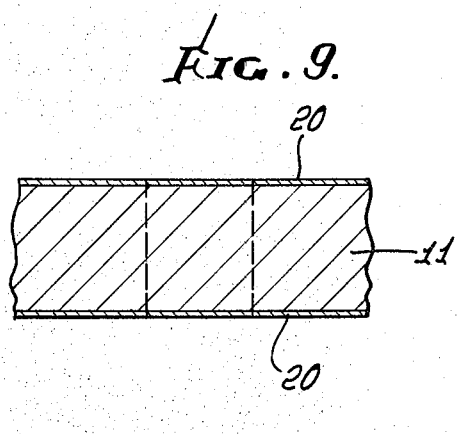

HIGH TEMPERATURE BRAZE REPAIR OF SUPERALLOYS

BACKGROUND OF THE INVENTION

This invention relates generally to repair of cracks in superalloys, and more particularly to methods for achieving enhanced compatibility between a braze compound and the article parent material, reduced distortion of the parent material, and for achieving high temperature properties of the final braze close to those of the parent material.

Superalloys are employed in articles such as gas turbine vanes because they exhibit high strength at high temperatures. Typical superalloys are nickle based alloys (as for example Rene 80), or cobalt based alloys (X-40). Despite such desirable properties, superalloys can and do become cracked, in high temperature operation such as in gas turbine engines. It then becomes necessary or desirable to repair the cracks. It is further found that complex oxides, including one or both of Ti and Al, occur, particularly in the case of nickel based superalloy, and at the crack surfaces. Complex oxides also occur at crack surfaces in cobalt based superalloys. Such oxides must be removed in order to effectively repair the cracks. One approach has been to attempt removal of oxides through exposure of same to reducing atmospheres, such as hydrogen, in a furnace environment; however, this approach has been found impractical as a sole means to remove oxides prior to braze repair of cracks, as recognized in U.S. Pat. No. 4,098,450 to Keller. Further, full penetration of narrow cracks by the melted braze is not always assured. Treatment of nickel superalloys with active fluoride ions to remove oxides in cracks is disclosed in U.S. Pat. No. 4,098,450; however, the problem of subsequent, adequate braze penetration of cracks remains, and oxide removal is not satisfactorily assured and is not inspectable, nondestructively.

SUMMARY OF THE INVENTION

It is a major object of the invention to provide an improved method for repairing cracks in superalloys, and characterized as overcoming the above described problems. Basically, the improved method comprises the following steps:

(a) mechanically removing article metal adjacent to that part of the crack that extends from the article surface down to a substantial depth in the article, thereby to form a wide mouthed recess (which typically has cup-shape) and so that the recess wall is oxide free, (b) filling into that recess a braze compound, that consists essentially of first and second portions in powdered state, the first portion consisting essentially of the same superalloy material as the article itself, (or an analogous material—i.e. one whose composition is close to that of the parent material) and the second portion consisting essentially of a braze component containing a melting point depressant, (c) subjecting the braze compound in the recess and also the article metal adjacent the recess to first elevated temperature under vacuum conditions to form a melt, that elevated temperature or temperatures being less than the melting temperature of the article metal adjacent the recess, and (d) thereafter subjecting the melt and the article material adjacent the recess to second elevated temperature or temperatures near the first elevated temperature and for an extended time sufficient to diffuse the depressant in the melt into the recess wall or walls and into the first portion of the mix, and thereby to raise the melting temperature of the melt.

As a result, a high strength, low distortion, braze repaired article is achieved, in a low cost, simple manner.

Further, and as will appear, the mechanical removal of the crack may be carried out by a cutter to produce the wide-mouthed recess; and specific first and second elevated temperatures and furnace treatment times are provided, as well as braze compositions, to achieve the desired objectives. In additions, the crack may be welded prior to braze repair of an associated crack, as will be described.

These and other objects and advantages of the invention, as well as the details of illustrative embodiments and examples, will be more fully understood from the following description and drawings, in which:

DRAWING DESCRIPTION

FIG. 2 is a section illustrating a crack in a metallic article;

FIG. 3 is a view like FIG. 2 showing mechanical removal of metal adjacent a portion of the crack, to form a recess;

FIG. 4 is a view like FIG. 3 but showing the article after braze compound has been filled into the recess;

FIG. 5 is a view like FIG. 4 but after the braze has been melted and diffused, and excess braze removed;

FIG. 6 is a view like FIG. 2, showing a crack extending through an article;

FIG. 7 is a view like FIG. 6 showing mechanical removal of metal adjacent all of the crack, to form a recess through the article.

FIG. 8 is a view like FIG. 7 showing braze compound filled into the recess;

FIG. 9 is a view like FIG. 8 but after the braze has been melted and diffused and excess braze removed;

Figure 11:
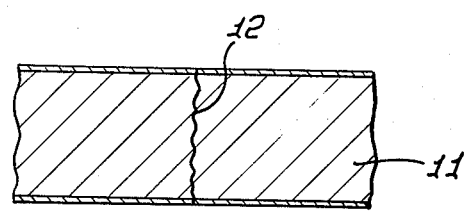
Figure 12:
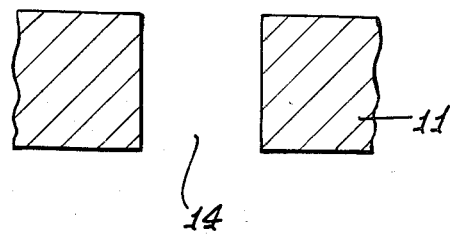

FIGS. 11 and 12 correspond to FIGS. 6 and 7; and

Figure 13:
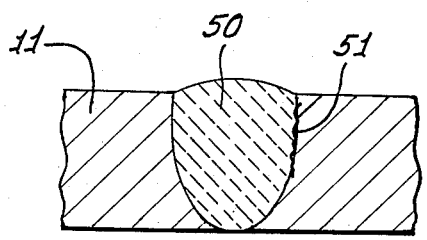
Figure 14:
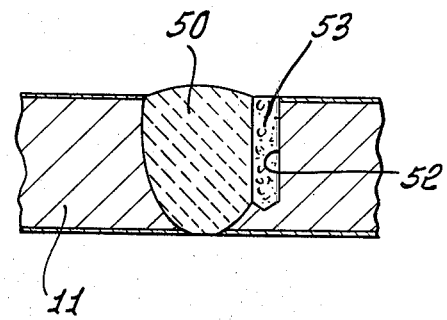

FIGS. 13 and 14 show welding and braze repair of an associated crack.

DETAILED DESCRIPTION

Referring to FIGS. 1-5 and 10, a metallic article, such as turbine vane 10, has a wall 11 that contains a crack 12. The wall may typically have a thin coating thereon, indicated at 11a. In the case of an article consisting of a superalloy material that includes nickel (Ni) or cobalt (Co) as a base material, the coating will for example consist essentially of nickel aluminide or cobalt aluminide. The known alloy Rene 80 is a nickel base superalloy, and the known alloy X-40 is a cobalt base superalloy, these being examples.

Figure 1:
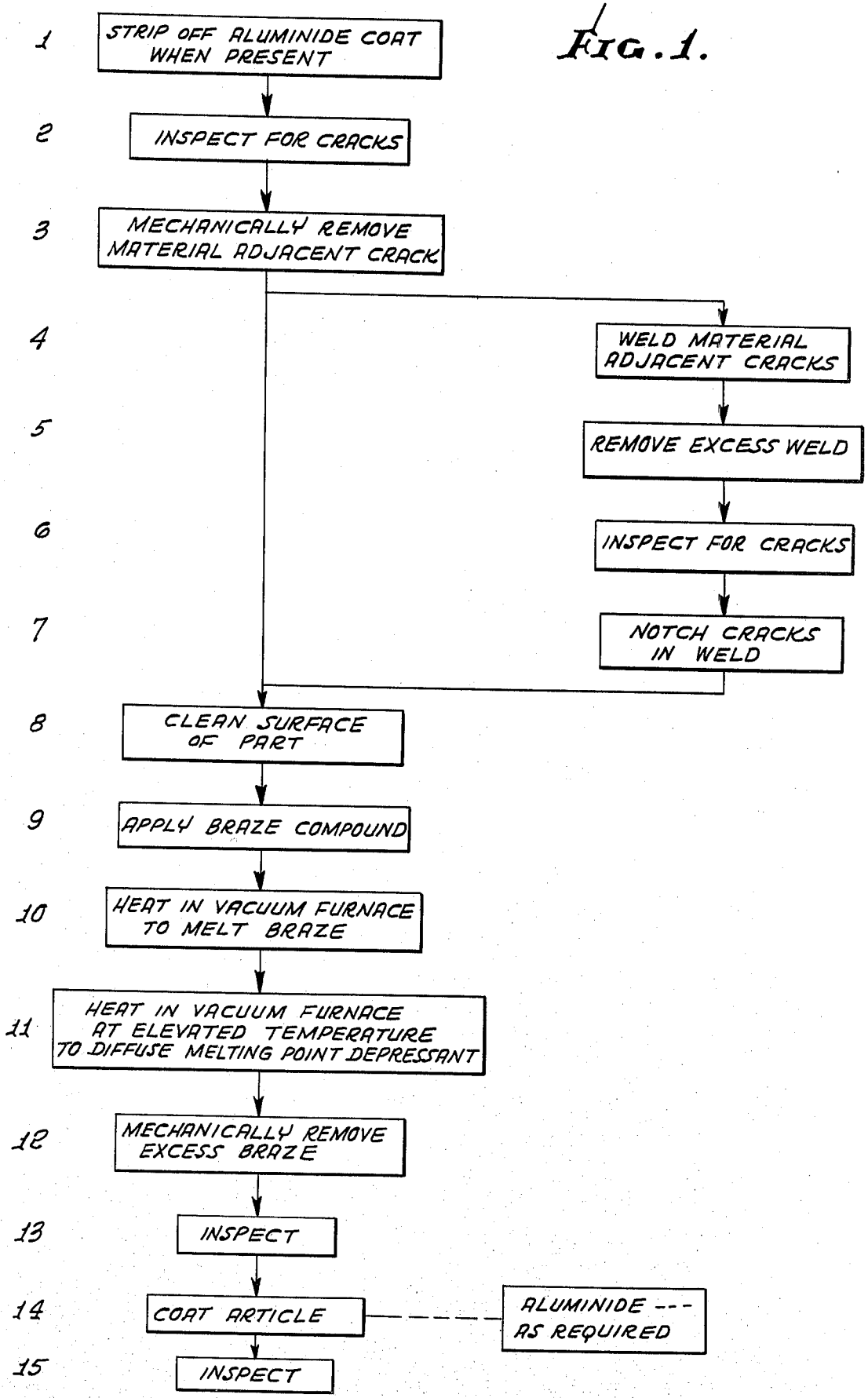
FIG. 1 is a diagram showing process steps.
Figure 10:
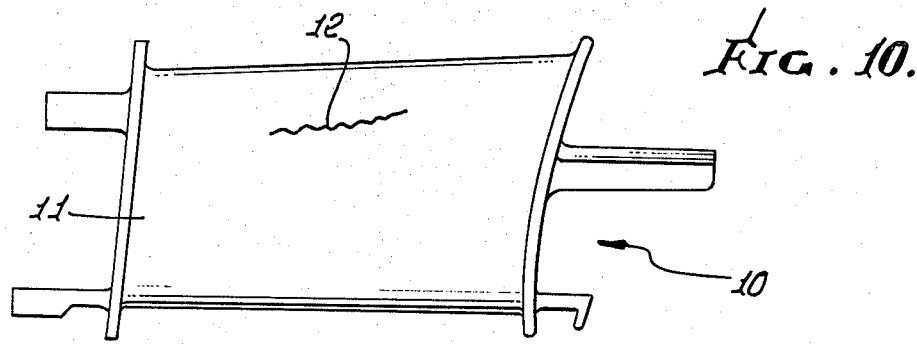
FIG. 10 is an elevation showing the article in the form of a turbine vane.

As indicated by the FIG. 1 diagram, the aluminide coating is first removed, as by an acid strip, nitric acid for example being used. After inspection for cracks, to determine the location of crack 12, a tool such as cutter 13 is employed to mechanically remove article metal adjacent that part of the crack that extends down to a depth "d" i.e., to a substantial portion of the crack's total depth. As a result, a wide-mouthed, cup shaped recess 14 is formed below top surface 15 of the article to have an oxide free wall or walls 14a at opposite sides of the former crack extent.

Step 8 contemplates cleaning of the part surface as by suitable organic solvent application followed by vapor degreasing. Step 9 is shown in FIG. 4 as including filling of braze compound 18 into the recess 14. The braze compound consists essentially of first and second portions in powdered state. The first portion consists essentially of the same superalloy material as the article 10 (or on an analogous composition) and the second portion consists essentially of a braze component containing a melting point depressant, such as boron for example.

One example of a usable braze compound or mix, for use in repairing cracks in a Rene 80 superalloy, comprises a first portion consisting of Rene 80 and a second portion consisting of BRB. About 50 weight percent of each of such weight portions is utilized in the mix for a weight ratio of 1/1. The weight percent contents of the two portions are defined as follows:

|  | Rene 80 | BRB |
| --- | --- | --- |
| Ni | base (balance) | base (balance) |
| C | .17 |  |
| Cr | 14.0 | 14.0 |
| Co | 9.5 | 9.5 |
| Mo | 4.0 |  |
| W | 4.0 |  |
| Ti | 5.0 |  |
| Al | 3.0 | 3.5 |
| B | .015 | 2.5 |
| Zr | .03 |  |
| Non-specified |  | .05 Max. |

An example of a usable braze compound or mix, for use in repairing cracks in an X-40 superalloy, comprises a first portion consisting of X-40 and a second portion consisting of AMS 4783. About 40 weight percent of X-40 and about 60 weight percent AMS 4783 are utilized in the mix the weight ratio of AMS 4783 to X-40 being about 3/2. The weight percent contents of the two portions are defined as follows:

|  | X-40 | AMS 4783 |
| --- | --- | --- |
| Co | based (balance) | base (balance) |
| Mn | .50 |  |
| Si | .50 | 8.0 |
| Cr | 25.0 | 19.0 |
| Ni | 10.0 | 17.0 |
| W | 7.5 | 4.0 |
| Fe | 1.5 | 1.0 |
| B |  | .8 |
| C | .50 | .4 |
| P |  | .02 Max. |
| S |  | .02 Max. |
| Al |  | .05 Max. |
| Tl |  | .05 Max. |
| Zr |  | .05 Max. |

In the above, the braze compound is in powder form, that will pass a 150 mesh screen. Also, sufficient carrier liquid is mixed with the powder to form a paste.

Step 10 in FIG. 1 constitutes subjecting the braze mix in the recess, as well as the article material adjacent the recess, to first elevated temperature and to vacuum conditions, for causing the mix to form a melt. Typically, the first elevated temperature T1 is less than the melting temperature of the article material, and is between 2125° F. and 2175° F., preferably about 2150° F. Accordingly, T1 is not so high as to melt the article metal itself, but is high enough to melt the mix, the intention being that the ultimate braze in the repaired article have melting temperature slightly below that of the parent material. The melting point depressant in the braze functions to lower its melting point. The time interval at which the braze is held at T1 is approximately 30 minutes, to completely melt the braze. The vacuum in the treating furnace is about $10^{-4}$ torr.

Step 11 in the sequence consists in subjecting the melt and the article material adjacent the recess to second elevated temperature or temperature T2 less than T1, and for extended time sufficient to diffuse melting point depressant (as for example boron out of the braze melt, thereby increasing the melting point of the braze melt to slightly below that of the parent material of the article, whereby the resultant article has been repaired to have approximately the same properties at the repair zone as exist in the parent material outside that zone. Typically, and by way of example, T2 is between about 2050° F. and 2150° F.; and the extended time interval includes a primary time interval during which the T2 remains at a lower level of the range (as for example at a level of about 2050° F.), and a secondary time interval during which T2 remains at a higher level within the range (as proximate at a level of about 2150° F.). The primary time interval is about 3 hours, and the secondary interval is about 4 hours, the treatment occurring in a furnace and at high vacuum, i.e., about $10^{-4}$ torr. These times and temperatures produce best results for the braze materials described in the above composition tabulations.

Steps 12–15 include, respectively, mechanical removal of excess braze, inspection of the braze repaired article, surface coating the article with aluminide where required, and final inspection. FIG. 5 shows the finished article, with protective coatings 20.

FIGS. 6–9 correspond to FIGS. 2–5, the difference being that the notch is of substantially the same cross section throughout its length. An example is a notch in the trailing edge of the vane. Accordingly, the recess 14 extends completely through the article wall. Braze 18 in FIG. 8 is filled into the recess to extend between opposite sides of the article, as shown. FIG. 4 differs from FIG. 8 in that the braze powder is substantially supported by the article.

FIGS. 11 and 12 are the same as FIGS. 6 and 7. FIG. 13 shows a weld 50 formed to bridge the recess 14, and corresponds to step 4 in FIG. 1. On occasion a crack will occur in association with the weld as represented at 51, in FIG. 13. That crack is then notched mechanically as indicated by notch wall 52, as seen in FIG. 14 (see step 7 in FIG. 1). Thereafter, braze compound 53 is filled into notch 52 and the treatment of the braze is then the same as per steps 9–15.

Other nickel based, usable superalloys include Inconel 713, 713C, 713LC, 738 and 718, B-1900 and Rene 77.

In these cases, the braze first portion could consist of the same superalloy, or Rene 80.

Other cobalt based usable superalloys include cobalt WI-52 and MAR-M509.

We claim:

1. The method for repairing a crack in an article consisting of superalloy material selected from the group that includes Ni and Co as a base material, the crack extending into the article from the surface thereof, the method comprising the steps:

(a) mechanically removing said material adjacent that part of the crack that extends from said surface down into the article, thereby to form in the article a recess whose walls are oxide free, (b) filling into the recess a braze mix that consists essentially of first and second portions in powdered state, the first portion consisting essentially of said superalloy material or a material analogous thereto, and the second portion consisting essentially of a braze component containing a melting point depressant, the weight ratio of said first and second portions being less than 1.5/1, (c) subjecting said mix in the recess and the article material adjacent the recess to first elevated temperature under vacuum conditions and for a first time interval for causing said mix to form a melt, said first elevated temperature being less than the melting temperature of said material adjacent the recess; and (d) thereafter subjecting the melt and the article material adjacent the recess to second elevated temperature near said first elevated temperature under vacuum conditions and for an extended time sufficient to diffuse the depressant out of a melt into the recess wall and into the first portion of the mix, and thereby to increase the melting temperature of said melt to slightly below that of the article superalloy material, (e) said extended time including a primary interval during which the second elevated temperature remains at an initial level lower than said first elevated temperature, and at a lower level within the range 2050°–2150°, and a secondary and subsequent interval during which the second elevated temperature remains at another level which is higher than said initial level, each of said primary and secondary intervals being less than five hours but substantially greater than said first time interval.

2. The method of claim 1 wherein said mechanical removal of the material adjacent the crack includes cutting away the superalloy material of said article adjacent opposite sides of the crack.

3. The method of claim 1 carried out to repair a crack extent associated with weld repair of a primary crack in the article.

4. The method of claim 1 wherein the crack extends completely through the article between opposite sides thereof and said mechanical removal step is carried out to completely remove article material between said opposite sides so that said recess communicates between said opposite sides.

5. The method of claim 1 wherein said first elevated temperature is between about 2125° F. and 2175° F.

6. The method of claim 5 wherein said second elevated temperature is between about 2050° F. and 2150° F.

7. The method of claim 6 wherein said initial level of said second elevated temperature is about 2050° F., and said other level of said second elevated temperature is about 2150° F.

8. The method of claim 7 wherein said primary interval is about 3 hours, and said secondary interval is about 4 hours.

9. The method of claim 8 wherein said subjecting of the mix to said first elevated temperature is continued for a time interval of about 30 minutes.

10. The method of claim 1 wherein said superalloy consists of Rene 80.

11. The method of claim 10 wherein said first and second portions of the mix are about equal in weight.

12. The method of claim 11 wherein said second portion of the mix consists of BRB.

13. The method of claim 1 wherein said superalloy consists of X-40.

14. The method of claim 1 wherein the article initially has a surface coat, including the initial step of removing said coat, at least adjacent the crack.

15. The method of claim 14 wherein the article comprises a turbine vane.

16. The method of claim 15 wherein said mix consists of about 40% by weight of X-40 and about 60% by weight of said second portion.

17. The method of claim 16 wherein said second portion of the mix consists of AMS4783.

18. The method of claim 1 wherein the article comprises a turbine vane.

19. The method of claim 1 wherein said depressant consists of boron.

20. The method of claim 1 wherein the powdered braze mix will pass a 150 mesh screen.

* * * * *